W. B. Young,
Plough.
No 74,474. Patented Feb. 11. 1868.
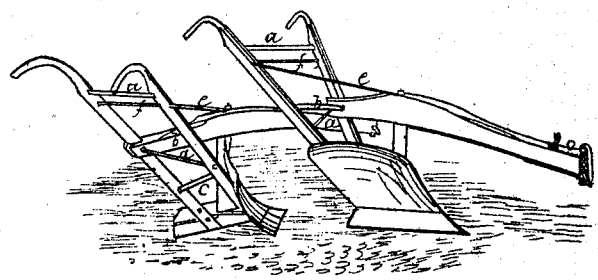
Witnesses
Geo H Laughlin
John Vans
Inventor
William B. Young

United States Patent Office.

WILLIAM B. YOUNG, OF CHICAGO, ILLINOIS.

Letters Patent No. 74,474, dated February 11, 1868.

IMPROVEMENT IN PLOUGHS.

*The Schedule referred to in these Letters Patent and making part of the same.*

TO ALL WHOM IT MAY CONCERN:

Be it known that I, WILLIAM B. YOUNG, of Chicago, in the county of Cook, and State of Illinois, have invented a new and useful Improved Plough; and I do hereby declare and make known that the following is a full, clear, and exact description of the same, reference being had to the accompanying drawings, which form part of this specification.

The nature of my invention consists in the peculiar arrangement of bracing and tying together the handles and beam to the plough by a combination of rounds as braces, and rods as ties, placed in a particular manner, as is hereinafter set forth.

The object of my invention is that I may be enabled to make a plough that shall be extra stiff and strong, thereby enabling me to reduce the weight of the plough by using lighter material, producing a light, stiff, strong plough.

In the usual way of putting rods and rounds to the plough, but little attention has been given to the idea of truss-bracing.

To enable those skilled in the art to make after my improved manner, I will proceed to describe as I make my plough, referring to the drawings and the letters of reference marked thereon.

$a$, $b$, and $c$ are wooden braces, which I call rounds, and $d$, $e$, and $f$ are rods, which I call ties. The $a$ round is placed near the top of the handles, each end entering the handles, and passes across about level. The $b$ round, one end enters the beam several inches forward of the beam-handle; the other end enters the mould-board handle. The $c$ round is placed between the handles, entering each near its bottom. The rounds $b$ and $c$, I usually place, their ends entering the mould-board handle some higher than I do the other end; yet it is not necessary. The rods $d$, $e$, and $f$, I use to tie together the bracing, forming a truss-work of great strength. One end of rod $d$ passes through the beam at the handle-mortise, having a nut each side of the beam; the other end passes through the mould-board handle several inches below round $b$, and has a nut outside of the handle, which is tightened down, bringing the handles firmly upon the rounds. Rod $e$ has one end secured on the top of the beam, at or near the main bolt or standard of the plough. The other end is secured to the mould-board handle near where the $a$ round is. $f$ is a rod, passing through both handles near the $a$ round.

I do not claim the use or position of any or either round or rod when used separately or in different combination from what I claim, for they have all been before used in other combinations from what I claim.

Having thus fully described my invention, what I desire to secure by Letters Patent, is—

1. I claim the combination of the round $b$ and rod $d$, with or without either or all the rounds $a$ and $c$, and rod $e$, substantially as described, and for the purpose set forth.

2. I claim the combination of rounds $a$, $b$, and $c$, and rods $d$, $e$, and $f$, with the handles and beam of a plough, substantially as described, and for the purpose set forth.

WILLIAM B. YOUNG.

Witnesses:
JOHN LANE,
GEO. H. LAUGHTON.